G. H. RICE.
HUB ATTACHING DEVICE.
APPLICATION FILED MAY 20, 1910.
982,745.
Patented Jan. 24, 1911.
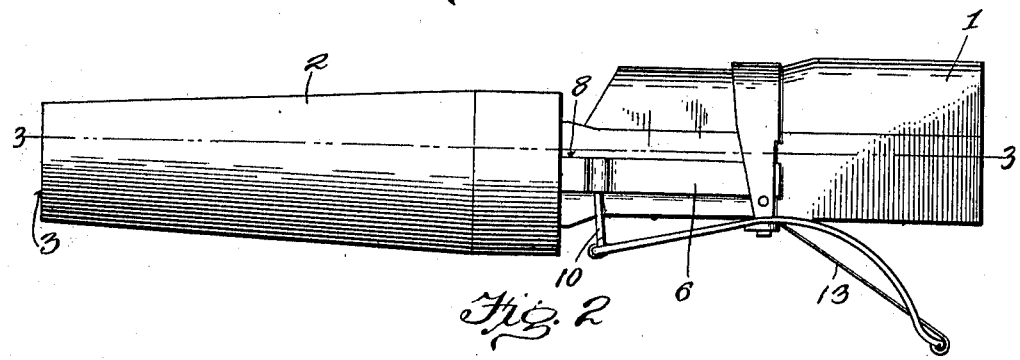
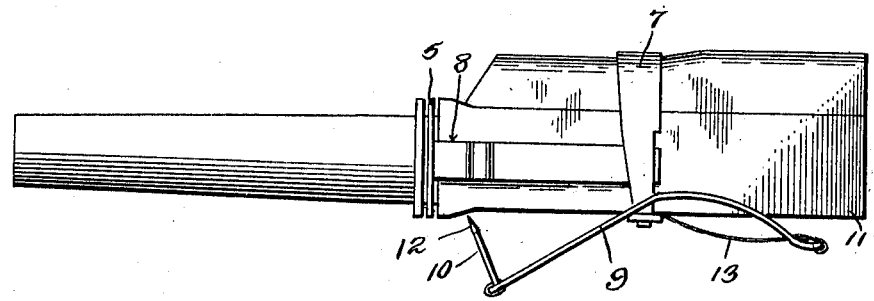
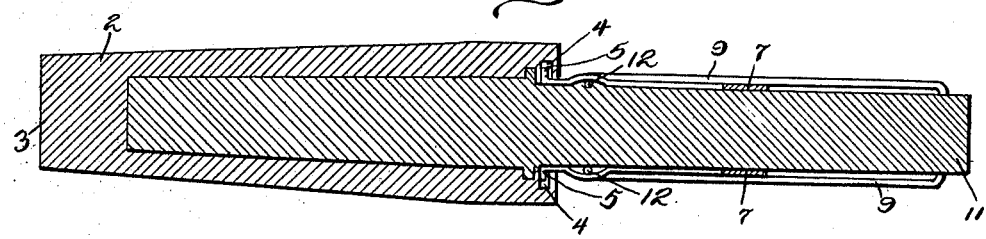
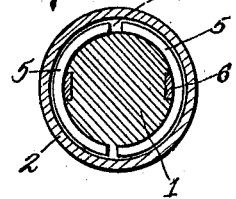
Witnesses
Wm S. McDowell
C. Edwonstow Jr.
Inventor
George H Rice
By Victor J. Evans
Attorney

UNITED STATES PATENT OFFICE.

GEORGE H. RICE, OF OLEANDER, CALIFORNIA.

HUB-ATTACHING DEVICE.

982,745.  Specification of Letters Patent.   Patented Jan. 24, 1911.

Application filed May 20, 1910. Serial No. 562,483.

*To all whom it may concern:*

Be it known that I, GEORGE H. RICE, a citizen of the United States, residing at Oleander, and in the county of Fresno and State of California, have invented new and useful Improvements in Hub-Attaching Devices, of which the following is a specification.

This invention relates to hub attaching devices and the object of the invention is the provision of means for securing the hub upon the axle without the use of the usual lock nuts and to avoid the expense of construction involved in the use of such lock nuts and in threading the axle for such nuts.

A still further object of the invention is the employment in a device of this character of a closed hub boxing which prevents the escape of the lubricant from the hub.

Further objects of the invention will appear as the following specific description is read in connection with the accompanying drawing which forms a part of this application, and in which:

Figure 1 is a side elevation of the end of an axle with the hub applied thereto. Fig. 2 is a similar elevation showing the position of the parts when the hub is removed. Fig. 3 is a horizontal section taken on the line 3—3 of Fig. 1. Fig. 4 is a transverse section taken immediately forward of the inner end of the axle housing or boxing.

Referring more particularly to the drawing 2 represents an axle housing or boxing which is secured in a hub in the ordinary or in any other suitable manner. This boxing has its outer end closed as at 3 and its inner end formed with an annular groove 4 which is adapted to receive the locking dogs 5. These locking dogs are carried upon the outer end of springs 6 which are securely held in place on the side of the axle by the clip 7 and lie in a longitudinal groove 8 formed in the axle. The normal tendency of the springs is to hold the dogs within the groove 8 and in order that they may be spread apart to engage the groove 4 there is pivoted upon the clip 7 a bell crank lever 9 which has connected to its outer end a yoke member 10 which straddles the axle 11 and has the outer end of its legs formed with cam faces 12 which pass between the axle and the springs and force the springs outwardly so as to cause the dogs 5 to engage the groove 4. The legs of the yoke are normally held in operative position to press the springs away from the axle by means of a leaf spring 13 which is secured to the under side of the axle by the clip 7 and has its outer end engaging the free end of the bell crank lever 9. In placing the hub upon the axle 11, the spring-pressed end of the bell crank lever is raised toward the axle thus lowering the yoke member 10 and its projecting legs from engagement with the springs which, when released cause the dogs to lie flat within the groove 7. The hub is now placed in position upon the stub end of the axle and the spring pressed end of the lever 9 released so that the spring 13 will force the yoke member toward the axle and push these legs between the springs and the axle thus forcing the springs outwardly and the lugs 5 into engagement with the groove 4. The hub is thus locked upon the axle and cannot be removed until the lever is again operated.

Having thus described the invention, what is claimed is—

The combination with an axle, of a hub boxing mounted thereon having a closed end, and an annular groove therein, said axle having grooves on opposite sides thereof, a pair of spring-pressed dogs arranged on opposite sides of the axle, and adapted to normally lie within the groove, a bell crank lever pivoted to the axle, a spring connected to one end of said lever and adapted to normally raise the opposite end, and a yoke member carried by the opposite end of the bell crank lever and straddling the axle, said yoke member adapted to enter between the axle and springs to force the dog away from the axle into the groove of the boxing.

In testimony whereof I affix my signature in presence of two witnesses.

GEORGE H. RICE.

Witnesses:
 D. M. BARNWELL,
 LOUIS F. RYALL.